United States Patent [19]

Schaefer

[11] 4,174,527

[45] Nov. 13, 1979

[54] METHOD FOR LOCALLY PRECISELY SETTING THE START AND END OF REPRODUCTION IN AN ENGRAVING APPARATUS

[75] Inventor: Klaus Schaefer, Rendsburg, Fed. Rep. of Germany

[73] Assignee: Dr. Ing. Rudolf Hell GmbH, Fed. Rep. of Germany

[21] Appl. No.: 874,790

[22] Filed: Feb. 3, 1978

[30] Foreign Application Priority Data

Feb. 12, 1977 [DE] Fed. Rep. of Germany ....... 2705993

[51] Int. Cl.$^2$ ............................................. H04N 1/26
[52] U.S. Cl. ..................................... 358/267; 358/299
[58] Field of Search ............... 358/299, 298, 302, 283, 358/272, 267, 268

[56] References Cited

U.S. PATENT DOCUMENTS

| 2,141,973 | 12/1938 | Finch | 358/272 |
| 3,272,918 | 9/1966 | Koll et al. | 358/298 |
| 4,013,829 | 3/1977 | Baar et al. | 358/299 |
| 4,013,831 | 3/1977 | Dolves et al. | 358/299 |
| 4,057,838 | 11/1977 | Doelves et al. | 358/299 |

FOREIGN PATENT DOCUMENTS 1379765  1/1975  United Kingdom .

Primary Examiner—Bernard Konick
Assistant Examiner—Donald. McElheny, Jr.
Attorney, Agent, or Firm—Hill, Van Santen, Steadman, Chiara & Simpson

[57] ABSTRACT

Method and apparatus for locally precisely setting the start and end of the reproduction of an image pattern wherein a first signal is produced by scanning a starting mark which determines the desired scanning start on the image pattern and a second signal "scanning start" is obtained from a circumferential impulse from the cylinders by means of an alterable time delay and that in order to set the scanning start on the image pattern for later reproduction the signals are brought into coincidence by altering the time delay during a test run with the aid of a comparator during the period when the signal "scanning start" occurs.

7 Claims, 5 Drawing Figures

METHOD FOR LOCALLY PRECISELY SETTING THE START AND END OF REPRODUCTION IN AN ENGRAVING APPARATUS

BACKGROUND OF THE INVENTION

1. Field of the Invention

This invention relates in general to apparatus for setting the start and end of reproduction in an engraving setup. Description of the Prior Art The present invention is an improvement upon U.S. Pat. No. 4,057,838 entitled "Process And Apparatus For Exactly Adjusting The Beginning And End Of A Reproduction In An Engraving Unit" in which the inventors are Juergen Doelves and Dieter Herforth which issued on Nov. 8, 1977. The drawings including the description and claims of U.S. Pat. No. 4,057,838 are hereby incorporated by reference which patent is incorporated in its entirety in the present application.

SUMMARY OF THE INVENTION

The present invention relates to a method and apparatus for locally precisely setting the start and end of reproduction in an engraving setup according with U.S. Pat. No. 4,057,838. The engraving setup described in U.S. Pat. No. 4,057,838 determines the desired scanning start on each image line of the image pattern by means of a starting mark on the scanning cylinder. The scanning always begins when this beginning mark is precisely located beneath the scanning organ. The circumferential position of the scanning organ in relation to the scanning cylinder is determined by a stationary fixed reference mark.

A signal "scanning start" which is obtained from the circumferential impulse of the cylinders by means of an adjustable time delay starts a scanning pulse sequence with which the scanning of the image points, the digitalization of the image signal and the intermediate storing of the digital image signal are controlled.

The setting of the scanning start is accomplished in that the marks are brought into coincidence by altering the time delay when the signal "scanning start" appears during a test run.

A stroboscope is used as an observation device and is triggered by the signal "scanning start". The scanning start is determined when the marks are conicidence at the time of a pulse flash of light.

The scanning in each image line is interrupted by switching off the scanning pulse sequence with the aid of a signal "scanning end" which is formed by counting the scanned image points per image line.

An additional end mark determining the scanning end on each image line is located on the scanning cylinder for seamless engraving and the stroboscope is additionally triggered by the signal "scanning end" whereby a second flash of light is generated. By altering the frequency of the scanning pulse sequence, the end mark and the reference mark of the scanning organ is brought into coincidence at the time of the second flash of light.

A signal "engraving start" determines the engraving start on the printing cylinder which starts a recording pulse sequence in a defined phase position. The signal "engraving start" is formed from the signal "scanning start" by an adjustable time delay.

An additional starting mark is assigned to the desired engraving start on the printing cylinder and a further fixed reference mark is assigned to the circumferential position of the recording organ relative to the printing cylinder.

The two marks are again brought into coincidence with the aid of a stroboscope triggered by the signal "engraving start" so as to determine the engraving start.

Reference marks are required for all utilization cases. These reference marks must be arranged very precisely on axis-parallel lines in relationship to the cylinders which run through the point of impact of the optical axis of the scanning or recording organ which has proven to be extremely disadvantageous.

It is therefore the object of the present invention to disclose a preferred further development of the method and apparatus disclosed in U.S. Pat. No. 4,057,838 which requires no reference marks and which facilitates a more precise setting of the start and the end of the reproduction.

This object is inventively accomplished in that a first signal is produced by means of scanning a starting mark which determines the desired scanning start on the image pattern and then a second signal "scanning start" is obtained from a circumferential impulse from the cylinders by means of an alterable time delay and the signals are brought into coincidence by altering the time delay during a test run with the aid of a comparator when the signal "scanning start" appears in order to adjust the scanning start of the image pattern for the later reproductions.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

The present invention relates to an improvement of the apparatus and method disclosed in U.S. Pat. No. 4,057,838 wherein a comparator is utilized so as to set the scanning start in an engraving setup. Since this invention consists of an improvement in the method and apparatus disclosed in U.S. Pat. No. 4,057,838 the disclosure including the specification, claims and drawings of Pat. No. 4,057,838 are hereby incorporated by reference and so as to simplify the present disclosure only the portions of U.S. Pat. No. 4,057,838 are disclosed in the present application which are necessary for an understanding of the present invention. However, the entire disclosure of U.S. Pat. No. 4,057,838 is hereby incorporated by reference in this description.

Figure 1:
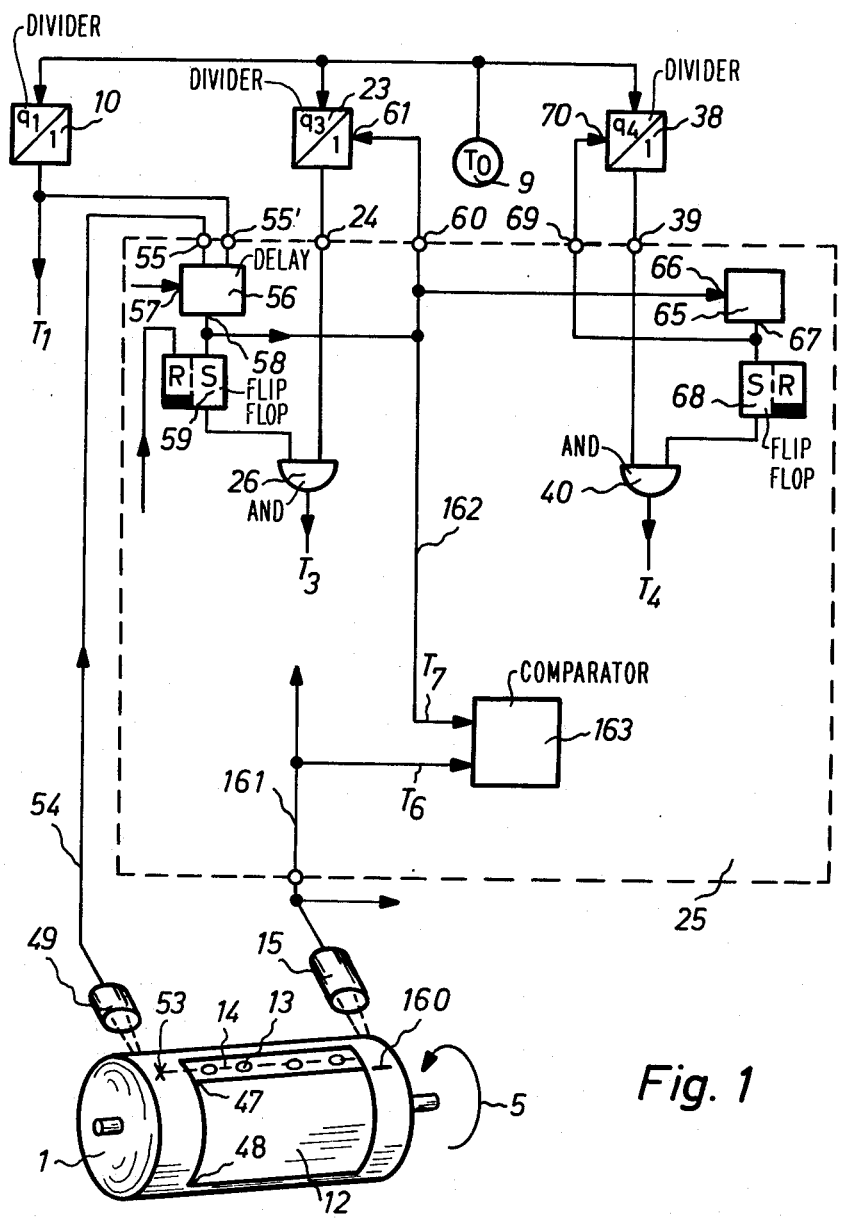
FIG. 1 illustrates a utilization example of the inventive comparator of the invention and its associated components.

FIG. 1 illustrates the scanning cylinder 1 which is driven in a direction as shown by arrow 5 by a suitable synchronous motor not shown but illustrated in U.S.

Pat. No. 4,057,838 which is driven from a generator 9 through a divider 10 to produce a signal $T_1$ and which is supplied through additional divider and converter transverter not shown which drives the drum 1 as described in U.S. Pat. No. 4,057,838.

An image pattern 12 is mounted on the drum 1 with the aid of registering pegs 13 which are arranged on a generatrix 14 of the scanning cylinder 1 so as to obtain an image signal. Image pattern 12 is opto-electrically scanned by means of a scanning member 15 image line by image line. The output of the scanning member 15 is supplied to an output lead and as shown in U.S. Pat. No. 4,057,838 is supplied to suitable data input terminals of an image line memory device with a write address counter, a read address counter and a digital memory as shown in U.S. Pat. No. 4,057,838. The output of the scanning device 15 is also supplied to lead 161 in a synchronization stage 25.

The scanning start, for example, may be determined by the upper edge 47 of the information carrying portion of the image pattern 12. In this case, the first image point of an image line is respectively scanned on the edge 47 whereby the upper edge of the image pattern 12 is masked out during reproduction.

The scanning start can be arbitrarily determined on the image pattern 12. The desired scanning start on the image pattern is marked by applying a mark 160 on the scanning cylinder 1 as shown in FIG. 1.

During a test run so as to set the scanning start, the scanning device 15 scans the mark 160 and produces an output pulse $T_6$ each time the mark 160 moves past the scanning organ 15.

During the test run, the impulse generator 49 produces a circumferential impulse by scanning the mark 53 with each cylinder rotation and said peripheral impulse is furnished to the delay stage 56 through terminal 55 in the synchronization stage 25 by way of line 54.

The delay stage 56 produces an output pulse $T_7$ which is the "scanning start" pulse and appears at the output of the delay device 56 and is connected to lead 162 where it is supplied to a comparator 163 as well as to a divider 23 which has an input terminal 61. Pulse $T_7$ is also supplied to a delay circuit 65 at its input terminal 66.

By changing the time delay of the setting input 57 of the delay stage 56 and with the aid of the comparator 163, the impulses $T_6$ and $T_7$ are brought into coincidence. The delay of the delay circuit 56 can be controlled by the input signal at terminal 57 and this is adjustable so that coincidence of the signals $T_6$ and $T_7$ can be obtained. The signal $T_7$ also sets the RS flip-flop 59 which produces the scanning pulse sequence $T_3$ through the AND gate 26 as described in detail in U.S. Pat. No. 4,057,838 and which is supplied to the write address counter and other components of the system illustrated in U.S. Pat. No. 4,057,838.

The impulse signal $T_7$ also simultaneously resets divider stage 23 via its reset input 61 whereby the scanning pulse sequence $T_3$ is started with a precise defined phase position relaive to the impulse signal $T_7$ "scanning start". Thus, it is assured that the first pulse of the scanning pulse sequence $T_3$ will be precisely controlled and will start the image point scanning in each image line when the mark 160 is precisely located beneath the scanning organ 15.

Figure 2:
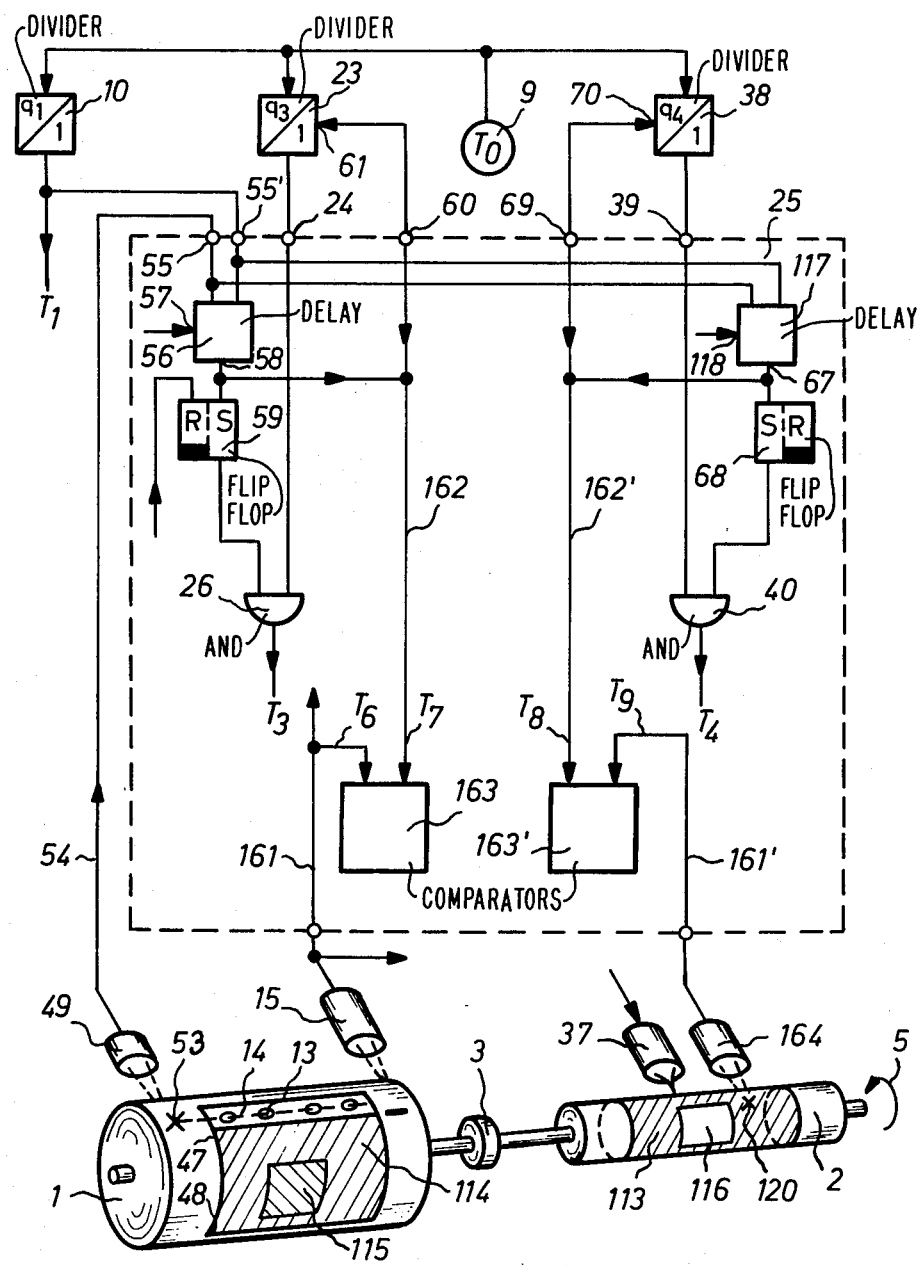
FIG. 2 illustrates the novel comparator as used during the setting of the scanning and engraving start.

FIG. 2 illustrates an example of the comparator of the invention so as to adjust the engraving start of the engraving of an image pattern in partially engraved printing cylinders. The printing cylinder 2 is coupled by a suitable shaft and coupling means 3 to the scanning cylinder 1 and the engraving member 37 is mounted adjacent the cylinder 2 and has an engraving needle as a cutting tool and performs the engraving. The engraving member 37 can be moved parallel to the printing cylinder 2 and the engraving tool 37 receives an input from the digital memory illustrated in U.S. Pat. No. 4,057,838.

Figure 5:
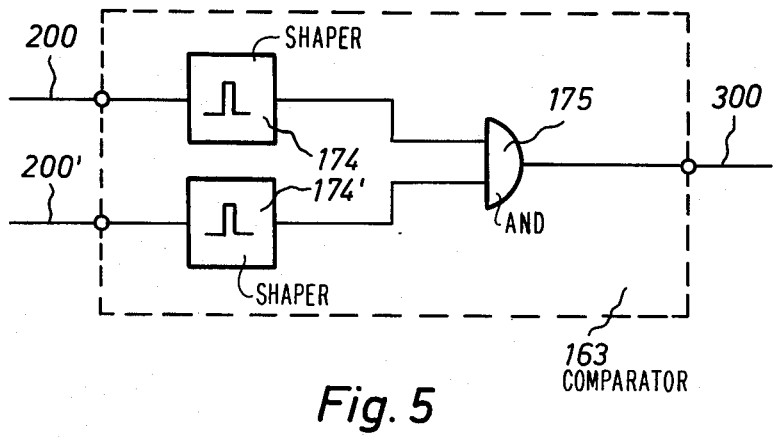
FIG. 5 is a modified form of the comparator.

FIG. 2 of the present application has a number of similarities to FIG. 5 of U.S. Pat. No. 4,057,838 and so as to correct imprecise peripheral position of the cylinders allows an impulse signal $T_8$ "engraving start" to be altered by means of an adjustable time delay in relation to the peripheral impulse.

The time delay is accomplished with the second delay stage 117 in the synchronization stage 25 which is connected to input terminals 55, and 55' of the synchronization stage 25 and has a time delay control input 118. So as to establish the desired engraving start a mark 120 was attached to the printing cylinder before the first engraving and the mark 120 indicates where the engraving of the respective first cup of an engraving line is to begin.

During a test run the mark 120 is scanned by a scanner 164 which always produces an impulse signal $T_9$ when the mark 120 passes underneath the scanner 164. The scanner 164 is mounted such that its optical axis meets the printing cylinder 2 on the same generatrix as the engraving stylus point of the engraving device 37.

The impulse signal $T_9$ is generated by the scanner 164 and supplied to lead 161' in synchronization stage 25 and to an input of a second comparator 163' in the synchronization stage 25. The comparator 163' also receives input pulse $T_8$ from the output of delay circuit 117 by a lead 162'.

With the use of the second comparator 163', the impulses $T_8$ and $T_9$ can be brought into coincidence by altering the time delay of the delay stage 117 at the control setting input 118. The impulse signal $T_8$ "engraving start" then sets the RS flip-flop 68 thus supplying an output at terminal 67 to the flip-flop 68 and releases the recording pulse sequence $T_4$ through the AND gate 40 which also receives an output from terminal 39 from a divider 38 which receives an input from generator 9. The input signal $T_8$ "engraving start" simultaneously sets the divider stage 38 through its input reset terminal 70 so that the recording pulse sequence $T_4$ at the output of the AND gate 40 is started in a defined phase relationship relative to the impulse $T_8$.

Thus, it is assured that the first pulse of the recording pulse sequence $T_4$ appears with each cylinder rotation precisely and introduces the cup engraving when the mark 120 is beneath the scanner 164 or the engraving stylus point tip of the engraving organ 37 is situated beneath the mark engraving start on the printing cylinder 2.

If this setting of the engraving start is accomplished with the first engraving and also with subsequent engravings, all subsequent engravings proceed in the circumferential direction relative to the first engraving and will precisely match.

Figure 3:
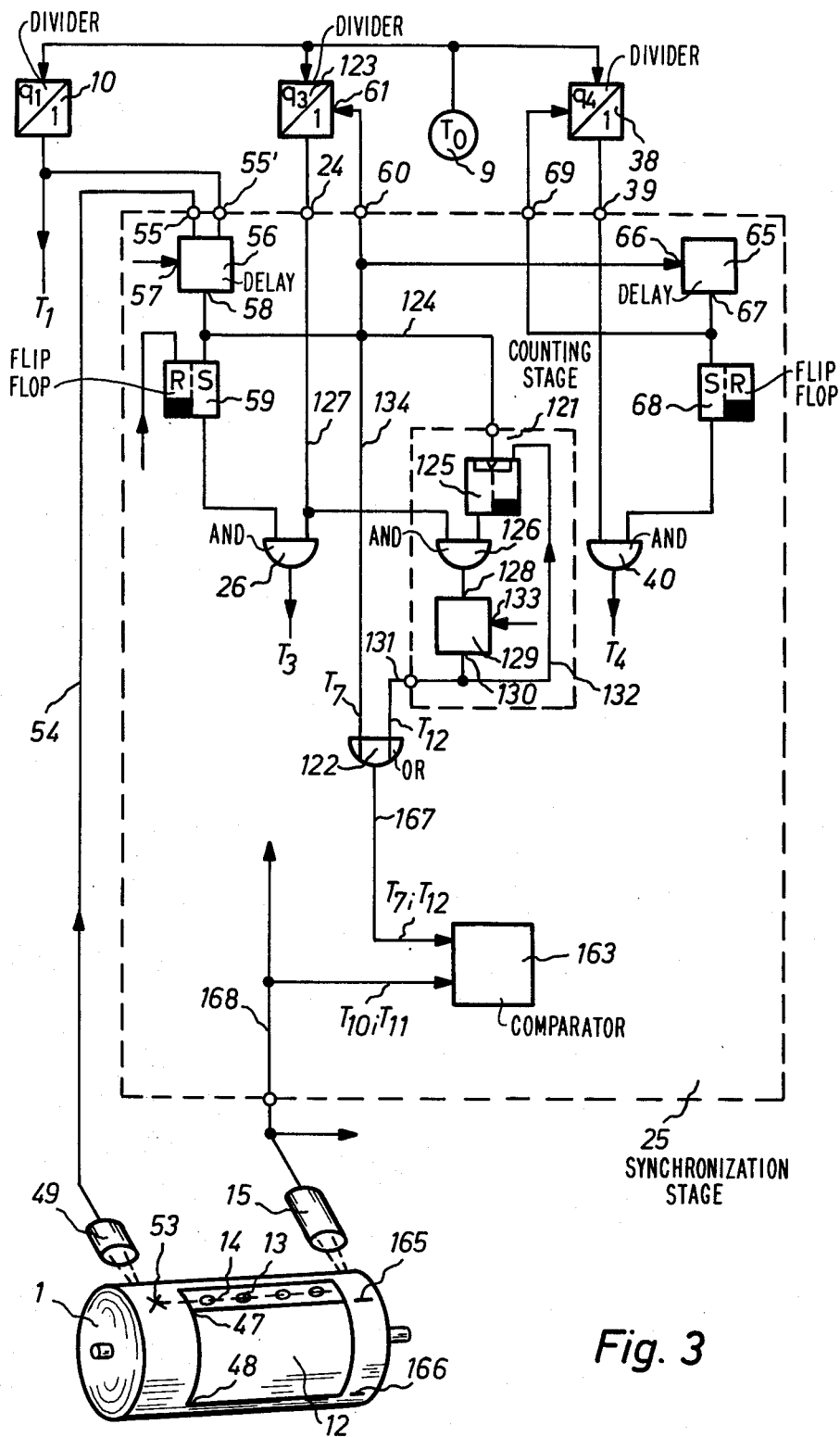
FIG. 3 is an example of the invention including the comparator during the setting of the scanning start and the scanning end.

FIG. 3 illustrates an additional utilization example of the comparator of the invention so as to set the scanning start and scanning end for seamless engraving. FIG. 3 is similar to the apparatus shown in FIG. 6 of U.S. Pat. No. 4,057,838 which is described in detail in U.S. Pat.

No. 4,057,838 and such description is hereby incorporated by reference."

The scanning start and scanning end on the image pattern 12 are marked on the scanning cylinder by marks 165 and 166 which are scanned by the scanning device 15 during a test run and the scanning device 15 produces consecutive impulse pulses $T_{10}$ and $T_{11}$ corresponding to the marks 165 and 166.

The impulse $T_7$ "scanning start" is obtained by means of a time delay of the peripheral impulse in the delay stage 56 of the synchronization stage 25 as described above.

A counting stage 121 receives the output of the delay stage 56 from terminal 58 by a lead 124 and produces an output pulse $T_{12}$ on lead 131 corresponding to the "scanning end". The additional impulse $T_{12}$ occurs after the pulse $T_7$ at $(Z_{A+1})$ counted-in pulses of the scanning pulse sequence $T_3$.

The impulses $T_7$ "scanning start" and $T_{12}$ "scanning end" are supplied to the comparator 163 through the OR gate 122 and through line 167. The impulses $T_{10}$ and $T_{11}$ from scanning device 15 are supplied by line 168 to the comparator 163 as shown.

So as to set the scanning start the impulse $T_7$ "scanning start" and the impulse $T_{10}$ associated with the mark 165 are brought into coincidence by changing the time delay of the delay stage 56 by changing the time delay input at the setting input 57 of the delay stage 56 with the use of the comparator 163.

So as to set the scanning end the frequency $f_3$ of the scanning pulse sequence $T_3$ is varied in the frequency divider 123 until the impulse $T_{12}$ "scanning end" and the impulse $T_{11}$ associated with the mark 166 are also in coincidence. When this is accomplished, the requirement to engrave a seamless endless pattern is fulfilled at the periphery of the printing cylinder 2.

Figure 4:
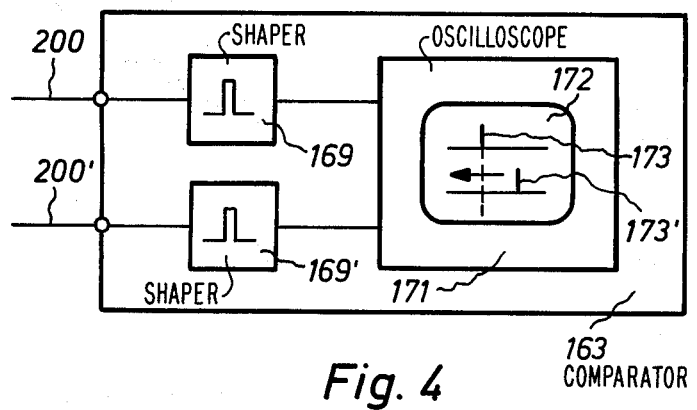
FIG. 4 is a sample embodiment of the comparator.

FIG. 4 illustrates a sample embodiment of the comparator 163 which comprises an optical observation arrangement so as to determine the coincidence of the incoming impulse signals.

The signals to be compared are supplied to leads 200 and 200' at the input of the comparator 163. Lead 200 is connected to an impulse shaper stage 169 and lead 200' is connected to an impulse shaper stage 169'. The outputs of the impulse shaper stages 169 and 169' are supplied to the vertical inputs of an oscillograph 171 and produce two vertical traces 173 and 173', respectively. The pulse width selected at the outputs of the pulse shaper stages 169 and 169' is selected so that both the pulse outputs of these devices will be the same and also the pulse width is selected to correspond with the permitted tolerance of the coincidence setting.

The vertical line traces 173 and 173' correspond to the input signals from the wave shapers 169 and 169' and appear on the fluorescent screen 172 of the oscillograph 171. By altering the time delay of the peripheral impulse one of the line marks 173 or 173' can be displaced in the horizontal direction. When coincidence of the pulses 173 and 173' is obtained, both of the traces 173 and 173' will lie on the same vertical line.

FIG. 5 illustrates an additional sample embodiment of the comparator 163 and forms an electronic coincidence circuit for the impulses. The impulses on input lines 200 and 200' which are to be compared are first supplied to a pair of impulse shaper stages 174 and 174' respectively so as to produce pulses with the same impulse width and having TTL levels. The impulse shaper stages 174 and 174' are connected to the inputs of AND gate 175 which produces an output H signal when the impulse signals appearing on lines 200 and 200' are in coincidence. Different forms of coincidence circuits can be utilized in invention.

The output of the AND gate 175 which is connected to lead 300 can be supplied to a recording device which supplies a visible or acoustical output whenever the H signal occurs.

The AND gate 175 could also be directly connected to the delay stages 58 and/or 117 in the synchronization stage 25. In this arrangement the output signal of the AND gate 175 would automatically start and terminate the time delay of the peripheral impulse.

Although the invention has been described with respect to preferred embodiments, it is not to be so limited as changes and modifications may be made therein which are within the full intended scope as defined by the appended claims.

I claim as my invention:

1. The method for the precise setting of a start and end of the reproduction of an image pattern wherein the image pattern mounted on a scanning cylinder is opto-electronically scanned line by line by a scanning member to obtain an image signal and wherein the image pattern is recorded on a recording cylinder by a recording member controlled by said image signal comprising the steps of setting a start mark on the scanning cylinder which determines the desired point at which scanning shall begin in each line of said image pattern, scanning said start mark by said scanning member to obtain a first control signal, producing a revolution mark pulse of the cylinder generating a second scanning start control signal by time delaying said revolution mark pulse and to set the scanning start for subsequent reproduction effecting coincidence for the first and second control signals with the aid of comparison means by altering said time delay during a test run.

2. The method of claim 1, wherein the comparison means is a cathode ray tube.

3. The method of claim 1, wherein the comparison means is an electronic coincidence circuit.

4. The method of claim 1, wherein the image signal is digitalized and the digital image signal is reconverted into an analog image signal and wherein the digitalization is controlled by a scanning pulse sequence and the second control signal starts the scanning pulse sequence in a defined phase relationship.

5. The method of claim 4, wherein as many successive pulses of the scanning pulse sequence are counted as image points scanned from an image line of said image pattern, and a third scanning end control signal is respectively produced with the last counted pulse, which interrupts the scanning pulse sequence in a defined phase relationship.

6. The method of seamless engraving according to claim 5, wherein the digital image signal is read into an intermediate store by the scanning pulse sequence and is read out and reconverted into an analog image signal, further comprising the steps of setting an end mark on the scanning cylinder which determines the desired point at which scanning shall end in each line of said image pattern, scanning said end mark by said scanning member to obtain a fourth control signal, and to set the scanning end for subsequent reproduction effecting coincidence for the third and fourth control signals with the aid of comparison means by altering the frequency of the scanning pulse sequence during a test run.

7. The method of subsequent engraving according to claim 1, wherein the image signal is digitalized and read into an intermediate store and is read out by a recording pulse sequence and reconverted into an analog image signal, whereby said recording pulse sequence defines the printing raster, further comprising the steps of setting a further start mark on the recording cylinder which determines the desired point at which recording shall begin in each line of said image pattern, scanning said start mark on the recording cylinder by a further scanning member to obtain a fifth control signal, whereby the further scanning member and said recording member are in coincidence in their peripheral circumferential position in relation to the recording cylinder, producing a sixth recording start control signal by time delaying said second control signal and to set the recording start for subsequent reproduction effecting coincidence for the fifth and sixth control signals with the aid of comparison means by altering said time delay of said second control signal during a test run and whereby the sixth control signal starts the recording pulse sequence in a defined phase relationship.

* * * * *